US007181083B2

(12) United States Patent
Dell'Eva

(10) Patent No.: US 7,181,083 B2
(45) Date of Patent: Feb. 20, 2007

(54) SYSTEM AND METHOD FOR CONFIGURING AN IMAGING TOOL

(75) Inventor: Mark L. Dell'Eva, Grand Blanc, MI (US)

(73) Assignee: Eaton Corporation, Cleveland, OH (US)

( * ) Notice: Subject to any disclaimer, the term of this patent is extended or adjusted under 35 U.S.C. 154(b) by 798 days.

(21) Appl. No.: 10/457,625

(22) Filed: Jun. 9, 2003

(65) Prior Publication Data

US 2004/0247203 A1  Dec. 9, 2004

(51) Int. Cl.
*G06K 9/40* (2006.01)
*G06K 9/32* (2006.01)

(52) U.S. Cl. ..................................... 382/255

(58) Field of Classification Search ............... 382/209, 382/218, 219, 254, 255, 276, 312, 294–297; 356/3.01, 3.02, 3.03, 6, 155, 139.03; 3/286, 3/288, 600
See application file for complete search history.

(56) References Cited

U.S. PATENT DOCUMENTS

| | | | |
|---|---|---|---|
| 4,179,696 A | 12/1979 | Quesinberry et al. | |
| 4,625,329 A | 11/1986 | Ishikawa et al. | |
| 4,690,557 A * | 9/1987 | Wiklund | 356/155 |
| 4,985,835 A | 1/1991 | Sterler et al. | |
| 5,005,973 A * | 4/1991 | Mimmack et al. | 356/139.03 |
| 5,051,751 A | 9/1991 | Gray | |
| 5,074,583 A | 12/1991 | Fujita et al. | |
| 5,229,943 A | 7/1993 | Eigler et al. | |
| 5,256,904 A | 10/1993 | Tohbaru | |
| 5,257,336 A | 10/1993 | Dautartas | |
| 5,298,988 A | 3/1994 | Everett et al. | |
| 5,366,241 A | 11/1994 | Kithil | |
| 5,398,185 A | 3/1995 | Omura | |
| 5,413,378 A | 5/1995 | Steffens, Jr. et al. | |
| 5,446,661 A | 8/1995 | Gioutsos et al. | |
| 5,490,069 A | 2/1996 | Gioutsos et al. | |

(Continued)

FOREIGN PATENT DOCUMENTS

GB    2 236 419 A    4/1991

(Continued)

OTHER PUBLICATIONS

Greg Welch and Gary Bishop, "An Introduction to the Kalman Filter", Sep. 4, 1997.

(Continued)

*Primary Examiner*—Amir Alavi
(74) *Attorney, Agent, or Firm*—Rader, Fishman & Grauer PLLC

(57) ABSTRACT

An imaging tool, including a lens, an imager, and a housing component, can be configured using a focus subsystem and an alignment subsystem. The focus subsystem can perform a focus heuristic using a source image to determine the appropriate focus of the lens. The alignment subsystem can perform an alignment heuristic using a calibration image to calculate the appropriate roll angle for the imager. The system can adjust the focus and alignment of the imaging tool in an automated manner. In some embodiments, the lens and alignment can be moved while they are within the housing component. System calculations can be performed accurately at the sub-pixel level. The system can be configured so that all computations are performed within the imaging tool itself, with the imaging tool passing messages to the configuration system regarding configuration instructions.

38 Claims, 15 Drawing Sheets

U.S. PATENT DOCUMENTS

| | | | |
|---|---|---|---|
| 5,528,698 A | 6/1996 | Kamei et al. | |
| 5,537,204 A | 7/1996 | Woodhouse | |
| 5,890,085 A | 3/1999 | Corrado et al. | |
| 5,983,147 A | 11/1999 | Krumm | |
| 5,998,929 A * | 12/1999 | Bechtel et al. | 315/82 |
| 6,005,958 A | 12/1999 | Farmer et al. | |
| 6,018,693 A | 1/2000 | Blackburn et al. | |
| 6,026,340 A | 2/2000 | Corrado et al. | |
| 6,043,877 A | 3/2000 | Land | |
| 6,055,055 A | 4/2000 | Toh | |
| 6,116,640 A | 9/2000 | Tanaka et al. | |
| 6,198,998 B1 | 3/2001 | Farmer et al. | |
| 6,272,411 B1 | 8/2001 | Corrado et al. | |
| 6,363,619 B1 * | 4/2002 | Schirmer et al. | 33/288 |
| 6,459,974 B1 | 10/2002 | Baloch et al. | |
| 6,577,936 B2 | 6/2003 | Farmer | |
| 6,662,093 B2 | 12/2003 | Farmer | |
| 6,678,058 B2 | 1/2004 | Baldwin et al. | |
| 6,777,927 B1 * | 8/2004 | Bomya | 324/207.17 |
| 2003/0016845 A1 | 1/2003 | Farmer | |
| 2003/0031345 A1 | 2/2003 | Farmer | |
| 2003/0123704 A1 | 7/2003 | Farmer et al. | |
| 2003/0133595 A1 | 7/2003 | Farmer et al. | |
| 2003/0135346 A1 | 7/2003 | Farmer et al. | |
| 2003/0234519 A1 | 12/2003 | Farmer | |

FOREIGN PATENT DOCUMENTS

| | | |
|---|---|---|
| JP | 61-66905 | 4/1986 |
| JP | 61-66906 | 4/1986 |
| WO | WO-02/30717 A1 | 4/2002 |

OTHER PUBLICATIONS

"GPS-Based Vehicle Tracking" by Jeffrey Pusan from www.securitydriver.com/aic/stories/article-97.html.

* cited by examiner

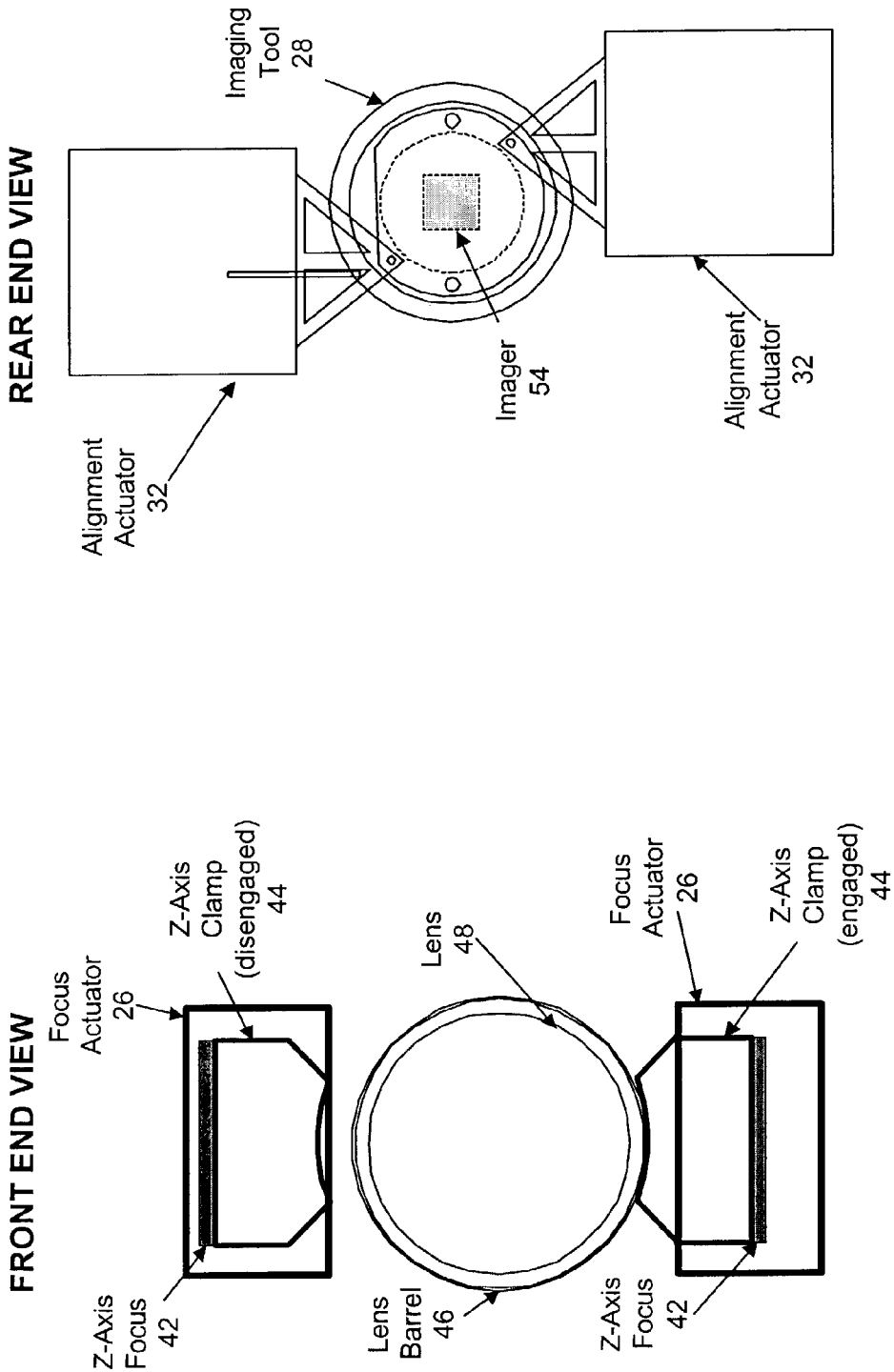

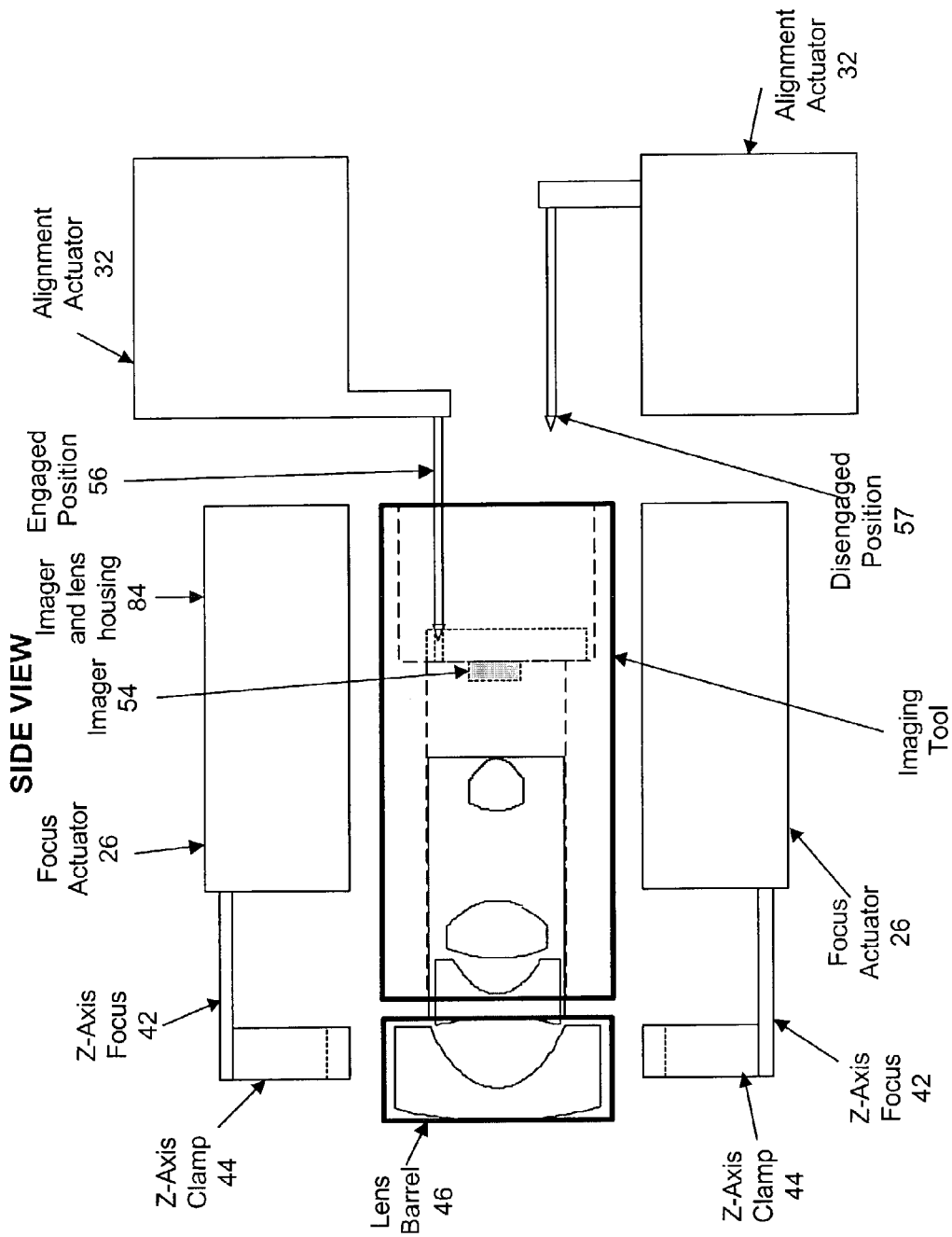

| Relative motion calculation | | | | | Ref Centroid | | Target Centroid | |
|---|---|---|---|---|---|---|---|---|
| | X | Y | Dist A-B | Rot Angle | X | Y | X | Y |
| A' | 0.000 | 0.600 | 1.200 | 35.055 | 0.000 | 0.000 | -0.071 | -0.082 |
| A | 0.420 | 0.263 | 1.200 | | | | | |
| B' | 0.000 | -0.600 | | | | | | |
| B | -0.562 | -0.426 | | | | | | |
| Center | X | Y | | | | | X | Y |
| | 1.300 | 1.300 | | | | | 0.071 | 0.082 |

Movement in two steps:
1a) Align Centroids

|  |  |  |  |
|---|---|---|---|
| Ax | -0.491 | Ay | 0.255 |
| Bx | 0.491 | By | -0.255 |

1b) Rotate Both Points

OR
2) Single Step

|  |  |  |  |
|---|---|---|---|
| Ax | -0.420 | Ay | 0.337 |
| Bx | 0.562 | By | -0.174 |

Check

|  |  |  |  |
|---|---|---|---|
| Ax | 0.000 | Ay | 0.600 |
| Bx | 0.000 | By | -0.600 |

Figure 11

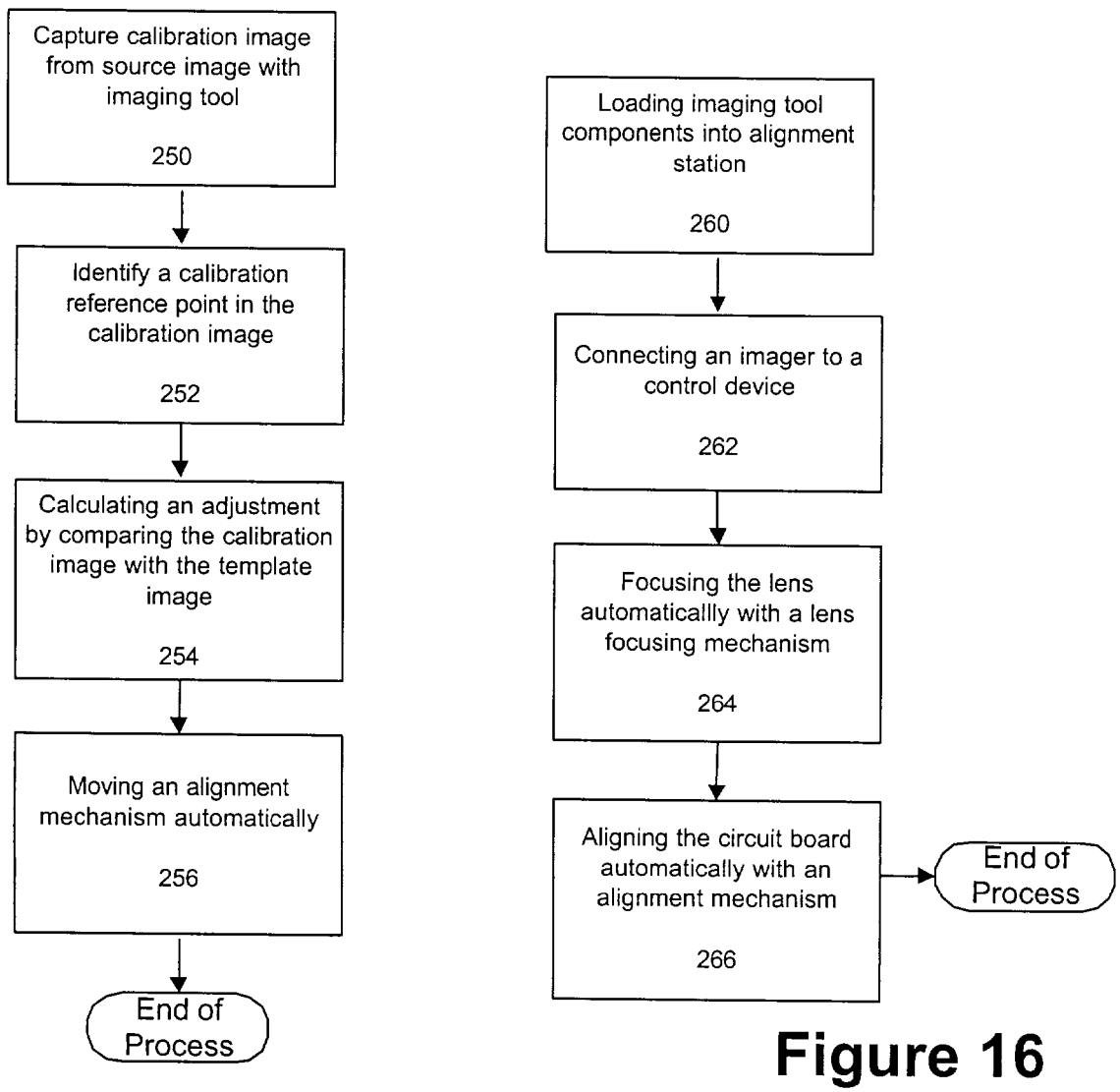

SYSTEM AND METHOD FOR CONFIGURING AN IMAGING TOOL

BACKGROUND OF THE INVENTION

This invention relates generally to methods and systems for configuring imaging tools. More specifically, the invention relates to methods and systems for focusing and aligning imaging tools located in a housing component for use in a predefined embedded application, such as an airbag deployment.

Embedded computers and other types of systems are making increasing use of various imaging tools. Different types of imaging tools can be used in a wide variety of different applications. For example, an imaging tool such as a digital video camera can be used by an airbag deployment application to identify the position of an occupant and make better deployment decisions. In such a context, the imaging tool can identify the position of the occupant within the physical space of the vehicle, and determine whether the movement characteristics of the occupant are such that the vehicle must be in a state of crashing, and whether the occupant will be within an at-risk-zone by the time in which an airbag could be deployed. Similarly, surveillance systems can use imaging tools to monitor specific areas of physical space, and potentially support various security-related processing. Industrial robots and other automated devices may incorporate various imaging tools as a set of "eyes" necessary to achieve there functions. Numerous other examples of image-based processing can be provided, and the number of image-based technologies may increase dramatically in the future as computation power becomes less expensive, inviting increased use of embedded imaging tools in various applications.

Regardless of the particular purpose of the imaging tool, it is often very important to focus and align the imaging tool in an accurate and cost-effective manner. Many image-based technologies are particularly vulnerable to slight deficiencies of focus or alignment. Moreover, the very purpose of the imaging tool may be to capture certain spatial relationships between objects in the sensor region. Such purposes are susceptible to even slight alignment, focus, and other configuration deviations. Heuristic processes can be performed on the images captured by various imaging tools. Many of those heuristics are dependent upon the imaging tool working within certain focus and alignment parameters. For example, an airbag deployment system may capture two-dimensional images of an occupant to determine the position of the occupant within three-dimensional space to determine whether or not the occupant is within the at-risk-zone of the airbag (e.g. too close to the deploying airbag) at the time of deployment. A difference of a few millimeters can make the difference between desirably deploying an airbag and the deployment of an airbag when the occupant is too close to the airbag. A discrepancy of mere microns between a correctly aligned imaging tool and an incorrectly imaging tool can substantially impair the ability of the imaging tool to capture images in an airbag deployment context.

Other uses of imaging tools are similarly vulnerable to undesirable tolerance stacking. The implementation of such imaging tools typically require manual configuration, and thus tend to be expensive and inaccurate.

SUMMARY OF THE INVENTION

This invention relates generally to methods and systems for configuring imaging tools (collectively the "configuration system"). More specifically, the invention relates systems for automatically focusing, aligning, and otherwise configuring imaging tools located in a housing component for use in a predefined application, such as an airbag deployment application.

An imaging tool that includes a lens, an imager, and a housing unit, is automatically focused by a focus subsystem and is automatically aligned by an alignment subsystem. The imaging tool provides for the capture of a calibration image from a source image. The focus subsystem performs an automated focus heuristic using the calibrated image. The alignment subsystem performs an automated alignment heuristic typically using the same calibrated image. In some embodiments, all configuration calculations are performed by the imaging tool itself. In such embodiments, the calculations can be performed by a computer or other device within the housing unit, and the resulting adjustment(s) are passed in the form of a message to the actuator or controller.

In some embodiments, the imaging tool is not permanently assembled until after the lens is focused and the imager is aligned. In other embodiments, the imaging tool is permanently assembled before the lens is focused and the imager is aligned, but such embodiments include some means, such as a tab accessible from outside the housing unit, for adjusting the focus and alignment of the imaging tool.

These and other features and advantages of this invention are described in or are apparent from the following detailed description of the preferred embodiments.

BRIEF DESCRIPTION OF THE DRAWINGS

Some of the embodiments of the present invention are described in reference to the following figures:

FIG. 2 shows a component diagram illustrating one example of a front end view of an imaging tool configuration system.

FIG. 3 shows a component diagram illustrating one example of a back end view of an imaging tool configuration system.

FIG. 4 shows a component diagram illustrating one example of a side view of an imaging tool configuration system.

FIG. 11 shows a data table illustrating one example of offset and roll angle computations.

FIG. 15 shows a flow chart illustrating a second example of an imaging tool configuration method.

FIG. 16 shows a flow chart illustrating a third example of an imaging tool configuration method.

DETAILED DESCRIPTION

This invention relates generally to methods and systems for configuring imaging tools (collectively a "configuration system"). More specifically, the invention relates systems for focusing, aligning, and otherwise configuring imaging tools located in a housing component for use in a predefined application. Examples of predefined applications include airbag deployment applications, surveillance applications, robotic applications, and any other automated device application in which a sensor ("imaging tool") is capable of collecting an image. The configuration system allows the imaging tool to be properly aligned, focused, and otherwise configured with respect to a housing component that contains the imaging tool. A high degree of accuracy and precision can be achieved, and such precision avoids the problems of tolerance stacking that can occur at each subsequent process in the manufacturing chain of devices that include imaging tools.

I. Environmental View

Figure 1:
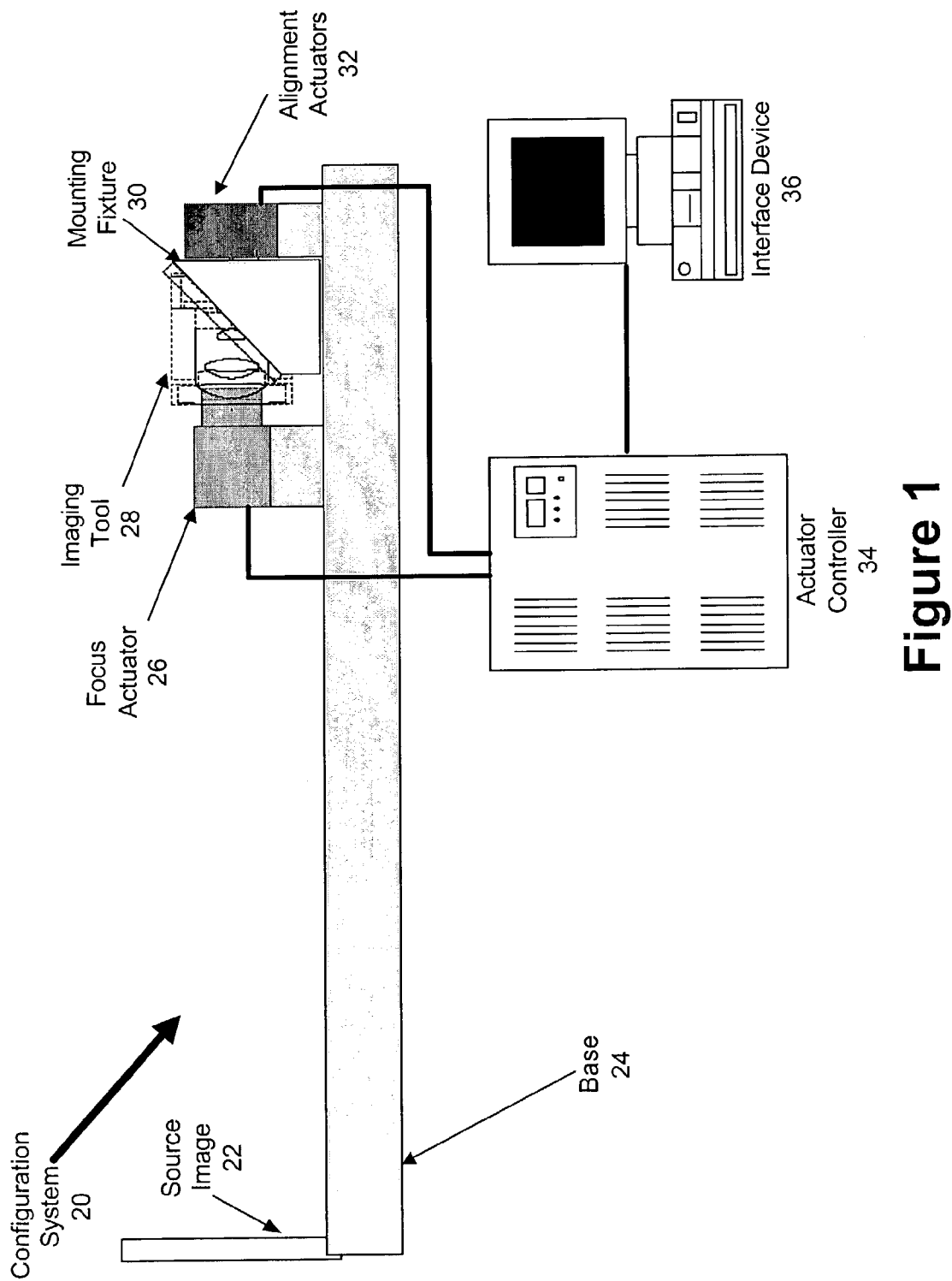
FIG. 1 shows an environmental diagram illustrating one example of an imaging tool configuration system.

FIG. 1 shows an environmental diagram illustrating one example of a configuration system 20.

A. Source Image

Some type of image or object is used to calibrate an imaging tool 28. That image or object is a source image 22. The source image 22 may include various source objects of various shapes. In a preferred embodiment, the source image 22 includes at least two reference objects, such as two black circles on a white background. However, the number of objects can vary from embodiment to embodiment, as can the characteristics (e.g. shape, size, color, height, width, luminosity, etc.) of the objects. Moreover, the background characteristics in the source image 22 behind the source objects can also vary widely. The type of source image 22 used to calibrate the configuration system 20 need not depend on the type of imaging tool 28, and the context of the predefined application that incorporates the imaging tool 28. For example, if the imaging tool 28 is an infrared camera used in the context of night vision surveillance, two black circles on a white background could still be used to configure the imaging tool 28. This is true even though the test conditions would not mirror night-time conditions. Virtually any combination of source images 22 can be used to configure a particular imaging tool 28 so long as the imaging tool 28 can distinguish between the source objects and the background characteristics of the source image 22 while being configured by the system 20.

B. Base

A base 24 supports many of the components in the configuration system 20. The base 24 can be made up of a wide variety of different materials. The base 24 can also vary widely in terms of its physical dimensions and shape. The base 24 should be strong enough to support the weight of the imaging tool 28, the source image, a focus actuator 26, an alignment actuator 32, and a mounting fixture 30. In some embodiments, an actuator controller 34 and an interface device 36 will also reside on top of the base. The base 24 should provide enough space for the imaging tool 28 to be moved in various directions (e.g. the x-direction, y-direction, and z-direction) with respect to the source image 22. In a preferred embodiment of the configuration system 20 in the context of an airbag deployment application, the distance between the imaging tool 28 and the source image 22 should be between approximately 15 and 25 inches, with a distance of 19 inches being desirable in many circumstances. This distance relates to the expected distance between the occupant sitting in the seat, and the location of the imaging tool 28 in the vehicle. In other embodiments, the desired distance may differ, depending on the particular application incorporating the particular imaging tool 28.

The base 24, focus actuator 26, mounting fixture 30, and alignment actuators 32 can collectively be referred to as an alignment station.

C. Imaging Tool and Imaging Assembly

The imaging tool 28 is the part of the configuration system 20 that is physically incorporated into the predefined application. For example, in an airbag deployment application embodiment, the imaging tool 28 is ultimately installed in a vehicle in order to capture video images of vehicle passengers. In contrast, many of the other components in FIG. 1, such as the source image 22, the base 24, the focus actuator 26, the alignment actuator 32, the mounting fixture 30, the actuator controller 34, and the interface device 36 can each be used to configure multiple imaging tools 28.

In some embodiments of the system 20, the imaging tool 28 includes the computer or other device used to calculate the appropriate focus, alignment, and other configuration parameters. In such embodiments, an image is never sent outside the imaging tool 28. Instead, the imaging tool 28 sends a message to the various actuators and/or actuator controller 34. The message includes the data used by the focus actuator 26 to focus the imaging tool 28 and the data used by the alignment actuator 32 to align the imaging tool 28. The ability of the imaging tool 28 to perform calculations internally is desirable in certain contexts. For example, each imaging tool 28 can be responsible for its own configuration calculations, supporting the ability of a single alignment station to configure many different types of imaging tools 28 with minimal configuration changes to the single alignment station.

The imaging tool 28 can itself be made of a wide variety of components. In an airbag deployment application embodiment, the imaging tool 28 can include an imaging tool 28, which includes an imager sensor ("imager") attached to a circuit board. The imager is the part of the imaging tool 28 that converts optical images into a digital format of pixels that can be processed by computers and other devices. In addition to the imager, the imaging tool 28, can also include a lens, a housing unit, and all of the electrical connections necessary for the imaging tool 28 to function. By configuring the imager with respect to the housing unit, it later becomes possible to configure the imaging tool 28 with respect to a particular application environment.

D. Mounting Fixture

A mounting fixture 30 is the mechanism that supports the imaging tool 28 in the alignment station. While the imaging tool 28 is supported by the mounting fixture 30, the focus actuator 26 and alignment actuators 28 can manipulate the position of the imaging tool 28 and its various components in a fully automated way. The characteristics of the mounting fixture 30 vary widely from embodiment to embodiment, and should be tailored to the specific requirements and structure of the imaging tool 28. All aspects of the configuration system 20 should be designed, constructed, and operated to support the goal of an accurate and precise imaging tool 28 highly configured to function in a particular application environment.

E. Focus Actuator

Actuators are mechanisms that provide for automatic action, such as moving or adjusting a component. The focus actuator 26 is any device or mechanism that can be used to automatically focus the imaging tool 28. Focusing the imaging tool 28 involves changing the distance (e.g. along the z-axis) between the source image 22 and one or more lenses in the imaging tool 28. The focus actuator 26 can also be referred to as a focus mechanism. Similar to other configuration system 20 components, the exact characteristics and structure of the focus actuator 26 can vary widely from embodiment to embodiment.

The focus actuator 26 can operate automatically without human intervention. As described below, the system 20 can generate the appropriate calculations to determine the desired adjustments to be made along the z-axis, and the focus actuator 26 can implement those adjustments.

F. Alignment Actuators

The alignment actuator 32 is used to align the imager within the imager assembly and/or align the imager assembly within one or more housing components that hold together the imaging tool 28 and its components. The alignment actuators 32 can also be referred to as an alignment mechanism. Movement along the x-axis, y-axis and roll axis is controlled by the alignment actuators 32. Similar to other configuration system 20 components, the exact characteristics and structure of the alignment actuator 32 can vary widely from embodiment to embodiment.

The alignment actuators 32 can operate automatically without human intervention. As described below, the system 20 can generate the appropriate calculations to determine the desired adjustments to be made along the x-axis, y-axis and roll axis, and the alignment actuators 32 can implement those adjustments. Each alignment actuator 32 moves the imaging tool 28 along the x-axis and y-axis. Between the adjustments in the x-axis and y-axis position is an angle that can be referred to as a roll angle. The two alignment actuators 32 can make the x-position and y-position, and roll axis adjustments in a single motion.

Just as the focus process centers on the position of the lens, the alignment process centers on the position of an imager 54. The imager 54 is typically located in a circuit board within the imaging tool 28.

G. Actuator Controller

The actuator controller 34 is the device that monitors and controls the activities of the alignment actuators 32 and the focus actuator 26. In a preferred embodiment, the images captured by the imaging tool 28 never leave the imaging tool 28, and only messages are passed from the imaging tool 28 to the actuator controller 34 or other parts of the alignment station. In other embodiments, the actuator controller 34 can receive images from the imaging tool 28, and perform the calculations needed to determine the adjustments necessary to properly focus, align, and otherwise configure the imaging tool 28.

H. Interface Device

The interface device 36 can be any type of terminal, computer, or industrial control equipment used by human beings to interact with the configuration system 20. Human users can use the interface device 36 to monitor the behaviors and results of the system 20. Human users can also use the interface device 36 to modify the heuristics used by the system 20 to automatically focus and align the imaging tools 28 processed by the system 20.

II. Structural View

A. Front End View

FIG. 2 shows component diagram illustrating one example of a front end view of an imaging tool configuration system 20. A lens 48 is composed of lens elements 96, 98, 99, 100 and the lens barrel 46. One or more lenses 48 of varying strengths, sizes, and other characteristics can be incorporated into the system 20.

The lenses and barrel can be supported by one or more clamps. Clamps used to assist in the focus of the imaging tool 28 can be referred to as z-axis clamps because those are the clamps the control the position of the imaging tool 28 with respect to the z-axis. A disengaged z-axis clamp 44 and an engaged z-axis clamp 44 are disclosed in the figure. Focusing of the lens typically requires the engagement of all z-axis clamps 44 in unison, but a wide variety of different structures and methodologies can be incorporated into the system 20. A z-axis focus 42 can adjust the position of the lens 48 with respect to the z-axis so long as the corresponding z-axis clamp 44 is engaged.

B. Rear End View

FIG. 3 shows a component diagram illustrating one example of a rear end view of an imaging tool configuration system 20. As the front end view of FIG. 2 centers on the focus functionality, the rear end view of FIG. 3 centers on alignment functionality. At the center of the diagram are some of the key components being aligned, the imager 54 which is at the center of the imaging tool with respect to the x-y plane. Both alignment actuators 32 facilitate movement by the imaging tool 28 and imager 54 in the x-direction as well as the y-direction.

B. Side View

FIG. 4 shows a component diagram illustrating one example of a side view of an imaging tool configuration system 20. Z-axis clamps 44 describe above hold the lens barrel 46 in place at the front of the imaging tool 28 (the left side of the diagram). The z-axis focus 42 connects the focus actuator 26 to the z-axis clamp 44 on both sides of the imaging tool 28. In between the two focus actuators 26 is the imaging tool 28 with the imager 54.

Hidden from view in the figure is the imager and lens housing 84, the component that in some embodiments encloses the imaging tool 28. On the right side of the diagram (rear end of the system 20) are two alignment actuators 32. For the purposes of example, the top alignment actuator is in an engaged position 56 and the bottom alignment actuator 32 is in a disengaged position 57. In many embodiments, both alignment actuators 32 are either engaged or disengaged at the same time.

C. Housing Component View (with Attachment Tabs)

Figure 5:
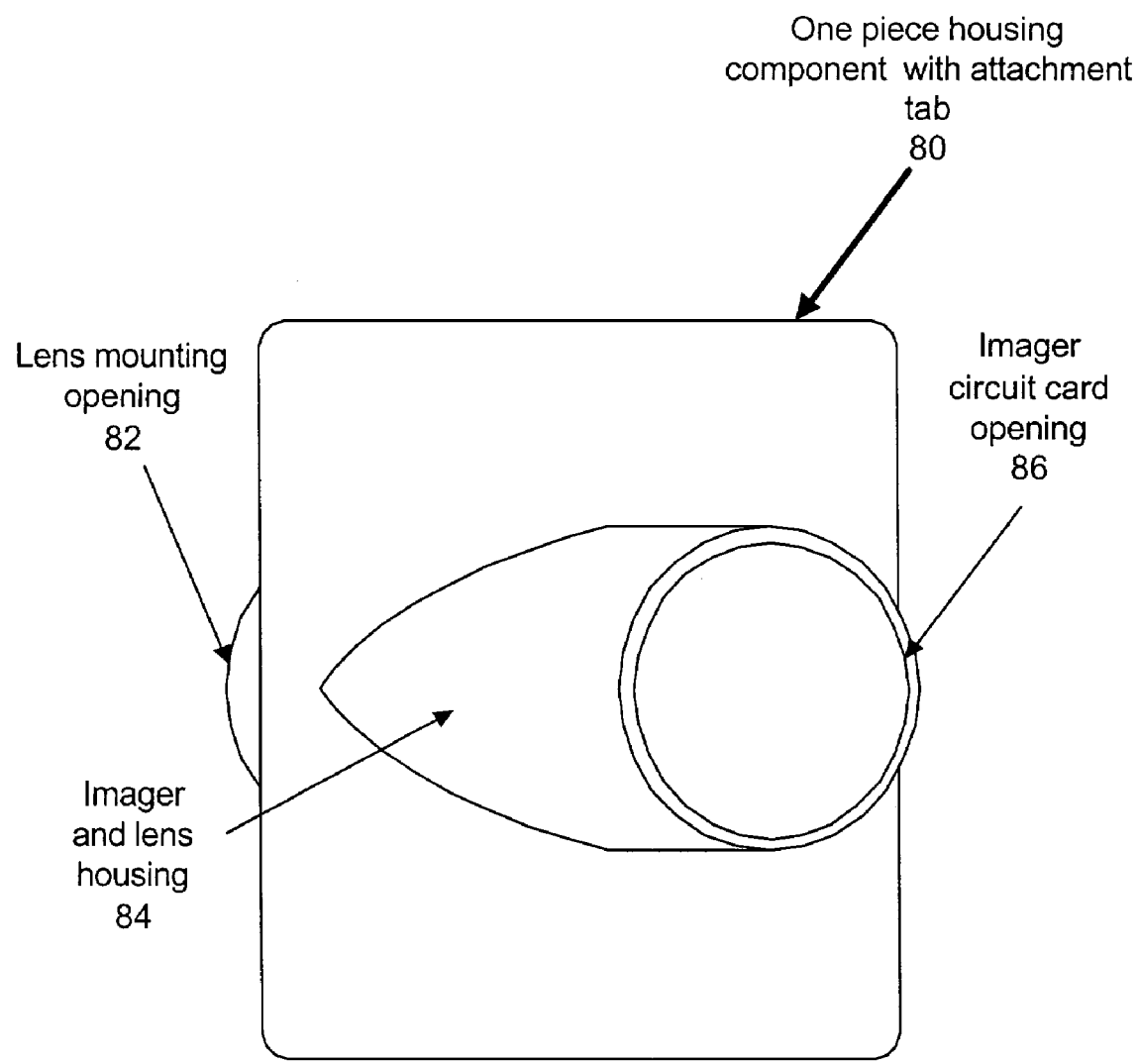
FIG. 5 shows a component diagram illustrating one example of a housing component and imaging tool.

FIG. 5 shows a component diagram illustrating an example of a housing component 80. The housing component 80 disclosed in the figure includes attachment tabs for connecting and fastening the housing component 80 (as well as the various components housed in the housing component) to the particular environmental structure for the configured imaging tool 28. The housing component 80 can vary widely from embodiment to embodiment, and may hide many components from view as the example in FIG. 5 indicates. A lens mounting opening 82, an imager and lens housing 84, and an imager circuit card opening 86 are visible in FIG. 5.

Figure 6:
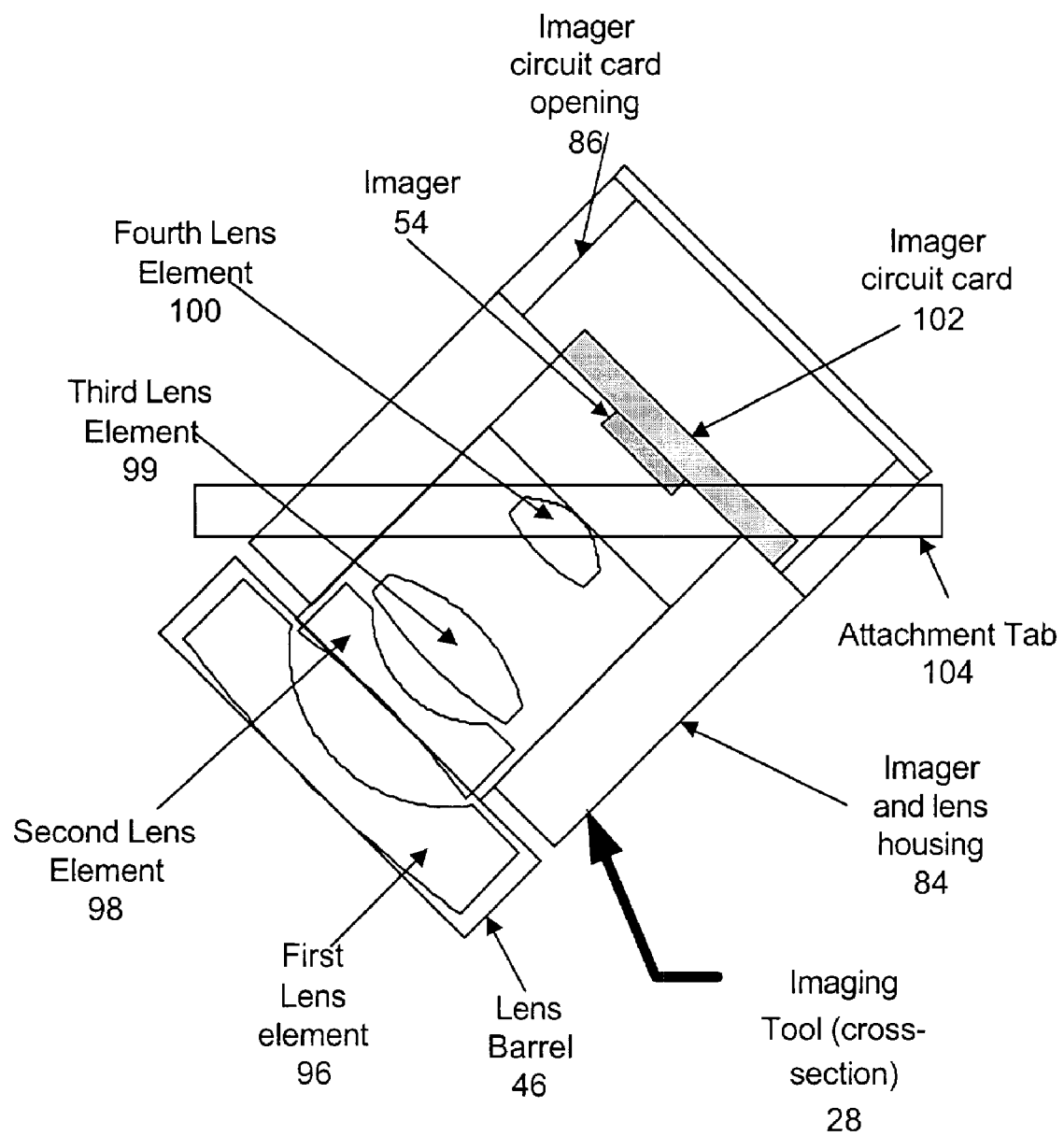
FIG. 6 shows a component diagram illustrating one example of an imaging tool that can be configured by the configuration system.

FIG. 6 shows a different perspective of the component diagram in FIG. 5. FIG. 6 shows a cross-section of the imaging tool 28. In contrast to FIG. 5, the attachment tabs 104 are hidden from view. The lens barrel 46 holds in place a first lens element 96 that is followed by a second lens element 98, a third lens element 99, and a fourth lens element 100. The number, type, and variety of lens elements will depend on the particular application that is to incorporate the particular imaging tool 28. The imager 54 resides on an imager circuit card 102 or circuit board. An imager circuit card opening 86 provides for the initial installation and alignment of the imager circuit board 102 in the imaging tool 28.

D. Exploded View

Figure 7:
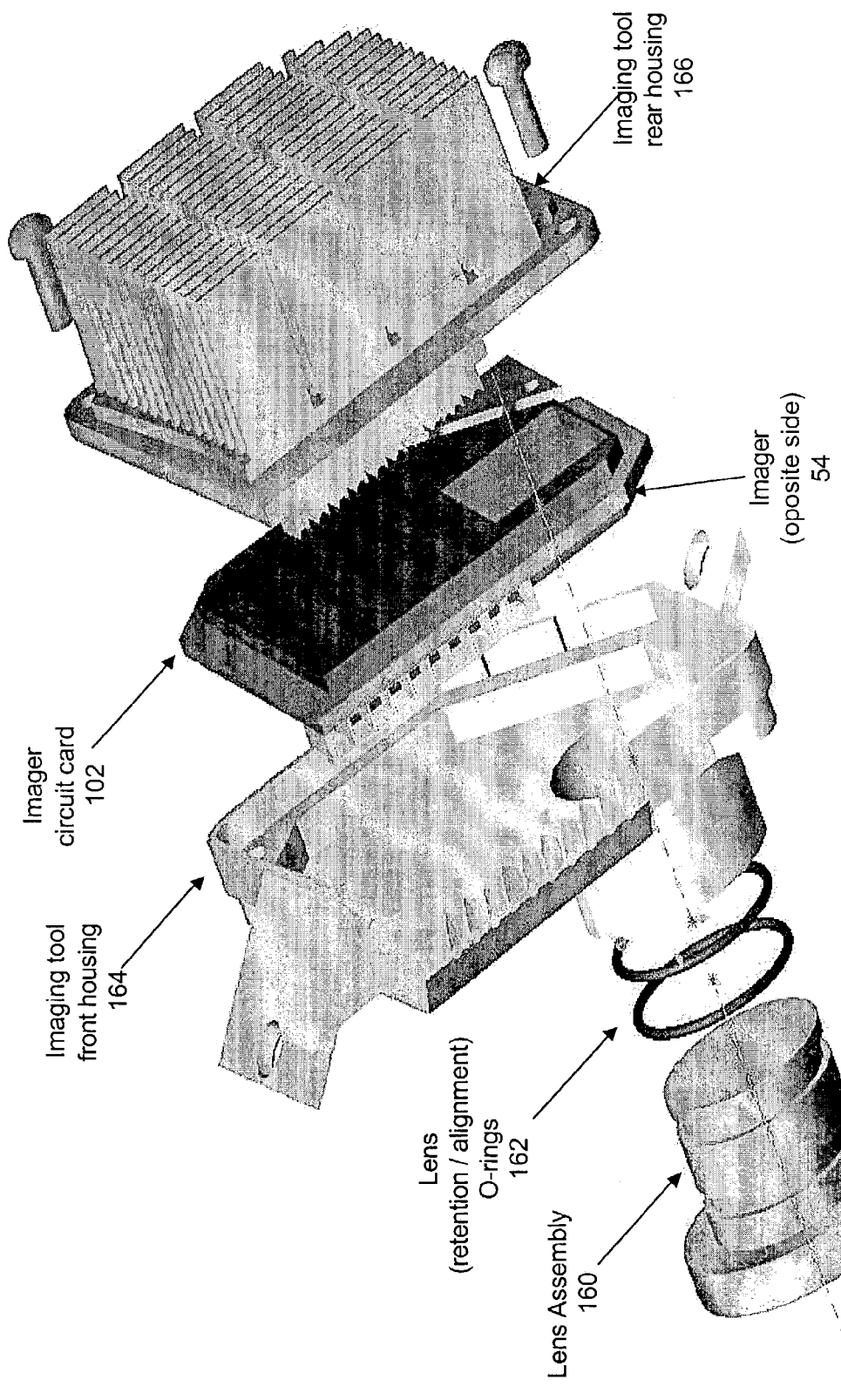
FIG. 7 shows a component diagram illustrating one example of a disassembled cross-component view of an imaging tool.

FIG. 7 show an example of an imaging tool 28 that includes a manipulatable tab for configuring the imaging tool 28 while it is assembled. In a manipulatable tab embodiment of the system 20, the imaging tool 28 and housing components 80 can be permanently attached before the imaging tool 28 is configured by the system 20.

The example in FIG. 7 includes two housing components 164 and 166 and an imager circuit card 102 that includes tabs for configuring the imaging tool 28 while it is assembled. In this embodiment, all of the components within the housing component 164 and 166 can be permanently attached before the configuration system 20 performs any processing. Parts of the imaging tool 28 are focused and aligned by the movement of "tabs" that are accessible from outside the imaging tool 28. The tabs can resemble various linear adjustment mechanisms in other devices. In some embodiments, the tabs for manipulating and configuring the imaging tool 28 may be the same tabs (the attachment tabs 104) used to connect the imaging tool 28 to its environment. In the example provided in FIG. 7, the tabs for aligning the circuit card 102 are not the same component as the attachment tabs 104 discussed above.

On the left side of the diagram is a lens assembly 160 that includes the various lenses incorporated into the imaging tool 28. The number and size of lenses can vary widely from embodiment to embodiment. A lens o-ring 162 is used to secure the position and alignment of the lens assembly 160. Some embodiments may not involve the use of o-rings 162, while other embodiments may incorporate multiple o-rings 160. A front housing component 164 and a rear housing component 166 are ultimately fastened together to keep the imaging tool 28 in a fully aligned and focused position. In between the two housing components is an imager circuit board 102 with the imager 54 on the other side, hidden from view.

Figure 8:
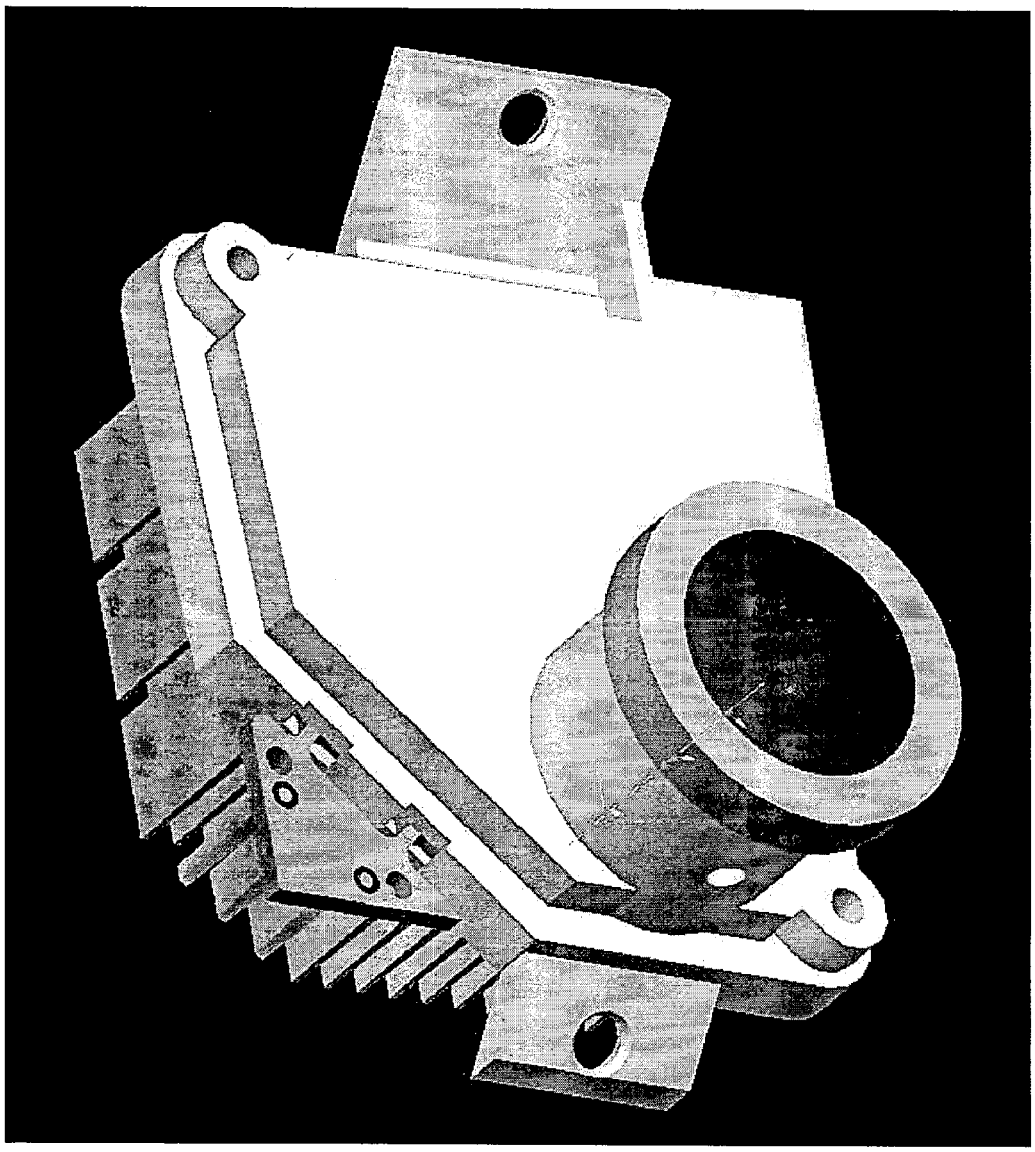
FIG. 8 shows a component diagram illustrating one example of a fully assembled imaging tool.

FIG. 8 shows a component diagram illustrating the imaging tool 28 of FIG. 7 in a fully assembled view.

III. Calibration Process

The process ("alignment heuristic") for automatically aligning the imager 54 within the imaging tool 28 can vary widely from embodiment to embodiment. Similarly, the process ("focus heuristic") for automatically focusing the lens 48 within the imaging tool 28 can vary widely from embodiment to embodiment. Both the alignment heuristic and the focus heuristic need to capture actual test images in order for proper configuration to occur. The system 20 then uses the actual test images to calibrate the imaging tool 28 using one of several calibration heuristics. Calibration heuristics involve capturing calibration images from source images, and comparing the calibration image to a template image, which can be the source image in some embodiments, or a numerical representation of the template image in other embodiments.

A. Capturing a Calibration Image

Figure 9:
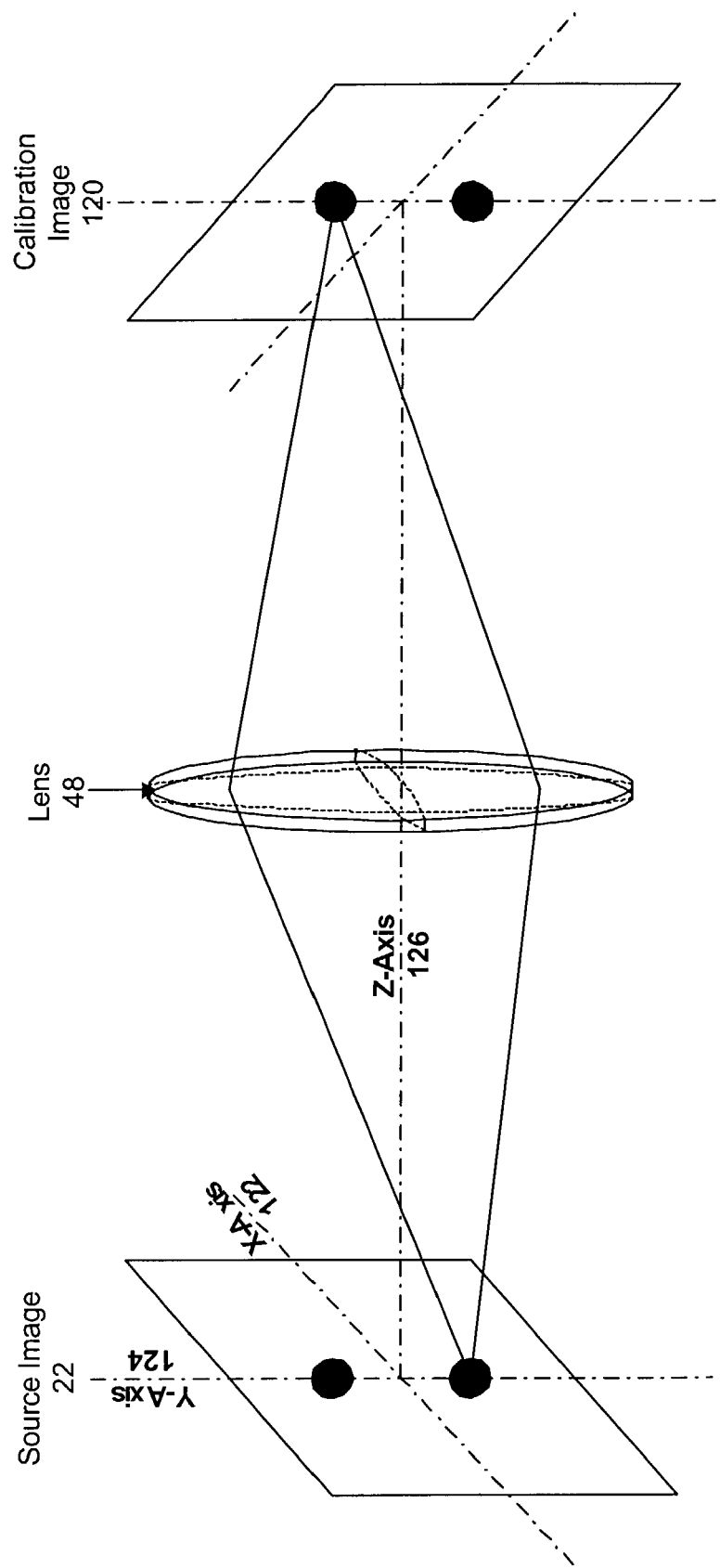
FIG. 9 shows a component diagram illustrating one example of a lens projecting a calibration image from a source image.

FIG. 9 shows a component diagram illustrating one example of a lens 49 projecting a calibration image 120 from the source image 22. As discussed above, the distance between the lens 48 and the source image 22 is measured along a z-axis 126, while the position of the various image objects in both the source image 22 and the calibration image 120 reside in the x-y plane at a fixed point along the z-axis. As illustrated in the example in FIG. 7, two black circles on a white background in the source image 22 are used by the lens 48 to create the calibration image 120.

B. Comparing the Calibration Image to a Template Image

Figure 10:
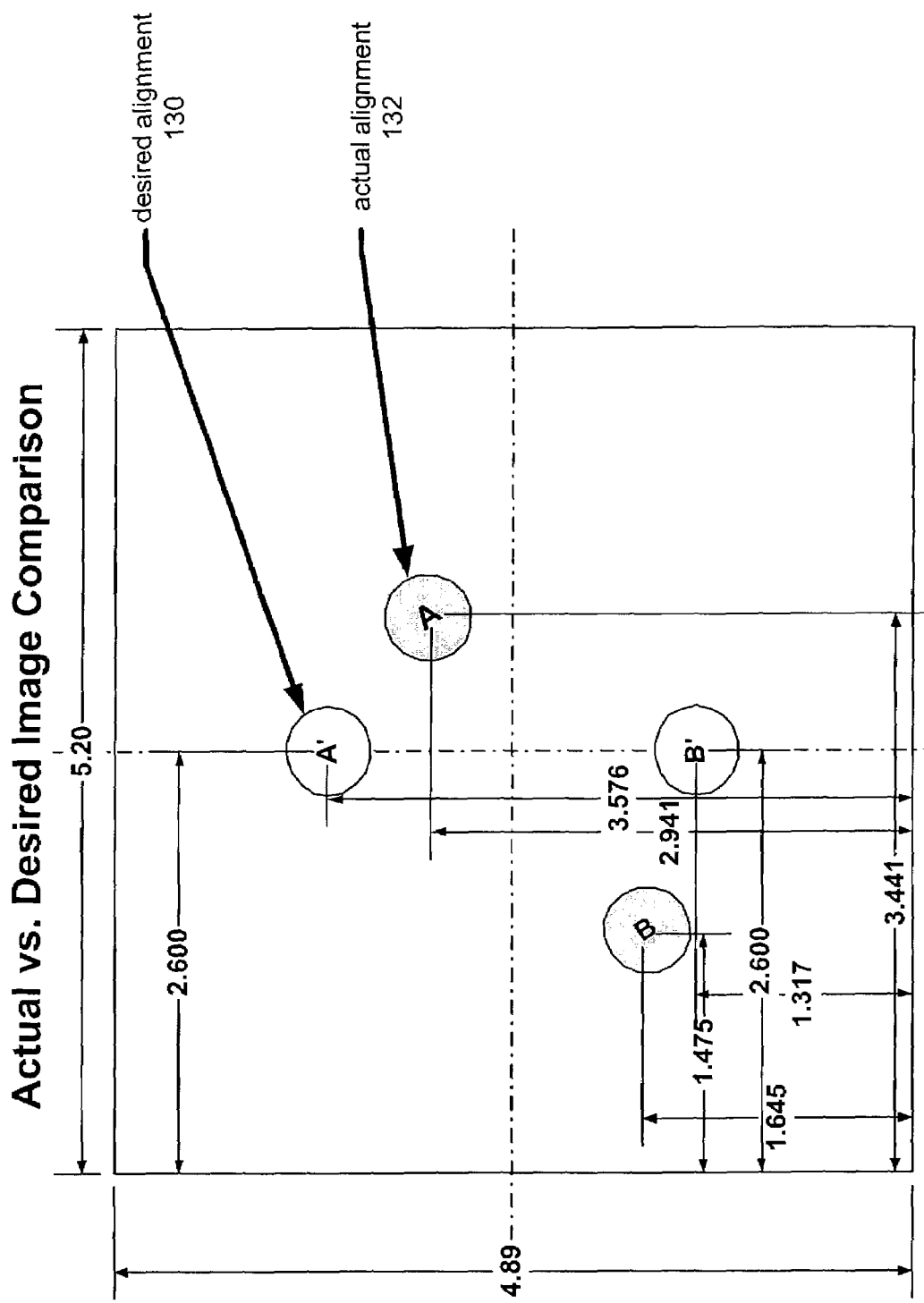
FIG. 10 shows a comparative diagram illustrating one example of an actual alignment being compared to a desired alignment.

FIG. 10 shows a comparative diagram illustrating one example of an actual alignment being compared to a desired alignment. An actual alignment 132 is the x-y coordinates for the two circles in the calibration image 120. The x-y coordinates for the target objects in the calibration image 120 can then be compared to the x-y coordinates of a desired alignment 130, that of a template image. The template image can simply be the known characteristics of the source image 22. As illustrated in the figure, the desirable adjustments in both the x-direction and the y-direction make evident a roll angle between the desired alignment 130 and the actual alignment 132.

C. Calculations

FIG. 11 shows a data table illustrating one example of offset and roll angle computations that can be incorporated into the system 20. As indicated in FIG. 8, circles A' and B' represent the desired alignment 130 while circles A and B represent the actual alignment 132. Because A' and B' represent the desired alignment 130, A' and B' can serve as the basis of the x-y coordinate system for both the template image and the calibration image 120. Coordinates can be assigned to each circle, with the origin of <0, 0> being at the center of A' and B'. Thus, the x-coordinate for A' is 0.0 and the y-coordinate for A' is 0.6. Similarly, the coordinates for B' are <0.0, −0.6>. The coordinates for A and B are measured to be <0.420, 0.263> and <−0.562, 0.426>.

With two sets of coordinates, one can calculate the roll angle from the actual alignment 132 to the desired alignment 130, which in the illustrated example is 35.055°. Similarly, the coordinates for the reference centroid, which can also be referred to as the template centroid, as well as the coordinates for the target centroid, which can also be referred to as a calibration centroid, can be computed. The template centroid in the example has the coordinates of <0.000, 0.000> because (0+0)/2=0 and (0.6−0.6)/2=0. The centroid coordinates for the calibration threshold are <−0.071, −0.082> because (0.420−0.562)/2=−0.71 and (0.263−0.426)/2=−0.082. As illustrated in the FIG. 11, the reference and target centroids can be aligned, and then both points in the actual alignment 132 can be rotated.

As is also illustrated in FIG. 11, the computations can also be performed in one step by adjusting each coordinate in the actual alignment 132 so that it is set at the corresponding coordinate in the desired alignment 130. For example, if the desired $A_x$ value is 0 and the actual $A_x$ value is −0.420, an $adjustment_{Ax}$ of 0.420 will transform the actual $A_x$ value to the desired $A_x$ value of 0. Similarly, if the desired $B_x$ value is 0 and the actual $B_x$ value is −0.562, an adjustment$_{Bx}$ of 0.562 will transform the actual $B_x$ value to the desired $B_x$ value of 0. Thus, adjustment$_{Ay}$=0.600−0.263=0.337 and adjustment$_{Ay}$=−0.600−(−0.426)=−0.174.

Regardless of whether the mathematics are performed in one step or in two steps, the actual alignment 132 can be transformed into the desired alignment 130 with one motion by the alignment actuators 32.

D. Stereo Embodiments

Figure 12:
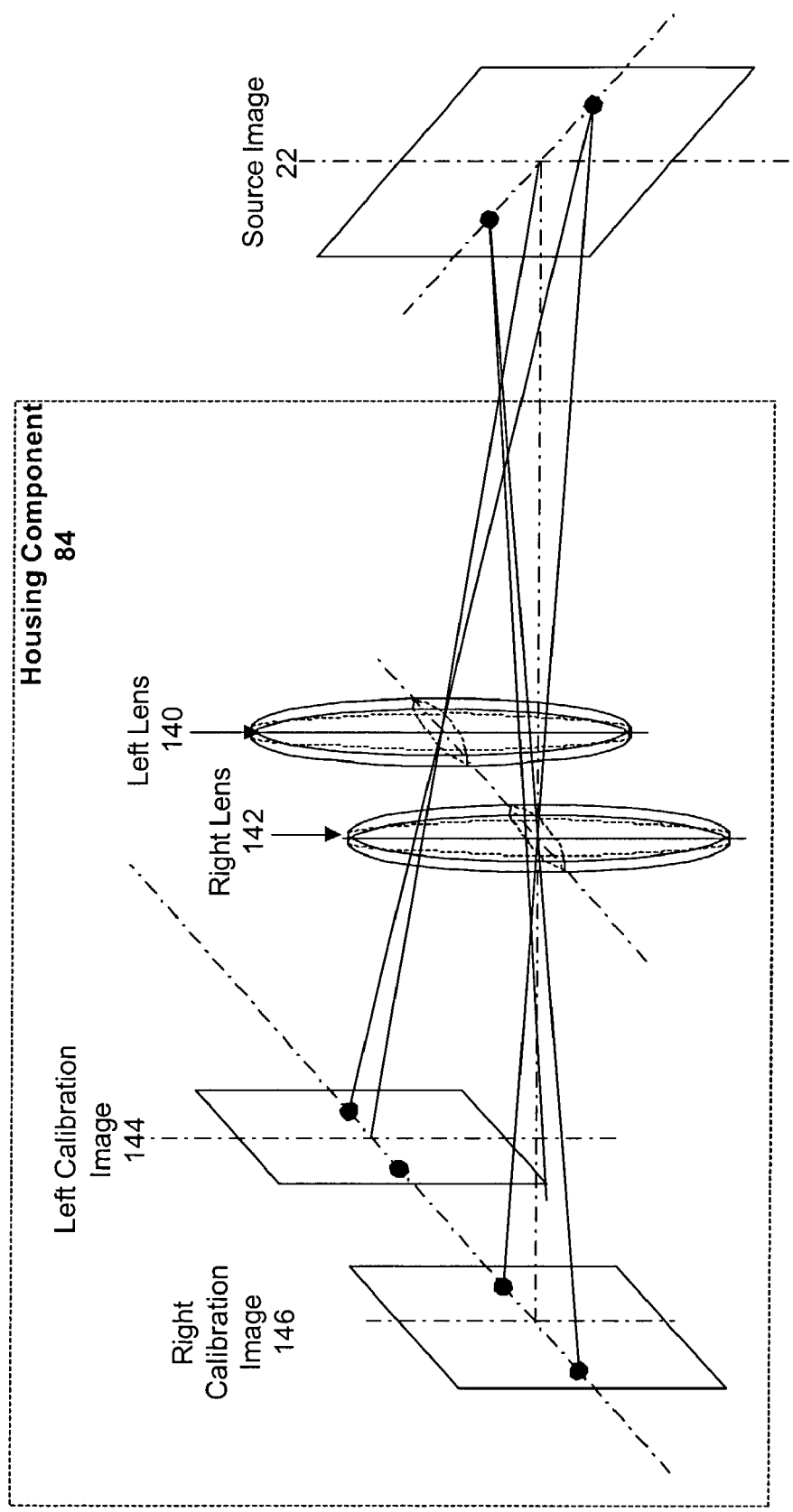
FIG. 12 shows a component diagram illustrating one example of a stereo of lenses projecting calibration images from a single source image.
Figure 13:
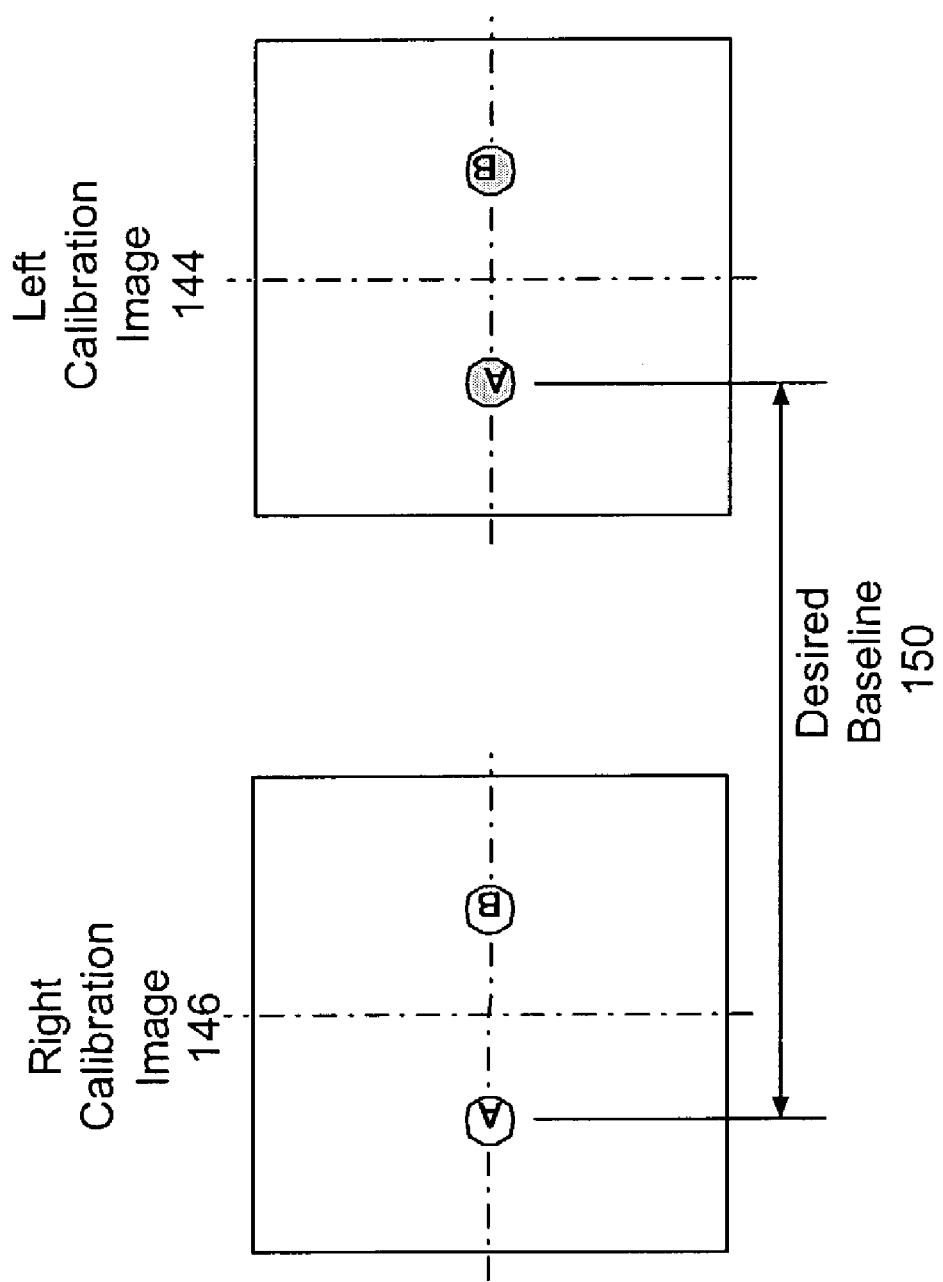
FIG. 13 shows a comparative diagram illustrating one example of a desired baseline in a lens stereo environment.

FIG. 12 shows a component diagram illustrating one example of a stereo of lenses 48 projecting calibration images 120 from a single source image 22. The housing component 84 includes a right lens 142 and a left lens 140 acting in unison on one source image 22 and generating a right calibration image 146 and a left calibration image 144. As FIG. 13 illustrates, both calibration images 120 share a common desired baseline 150, and the mathematics of FIG. 9 would also apply to the stereo embodiment in FIG. 11.

IV. Process Flows

Figure 14:
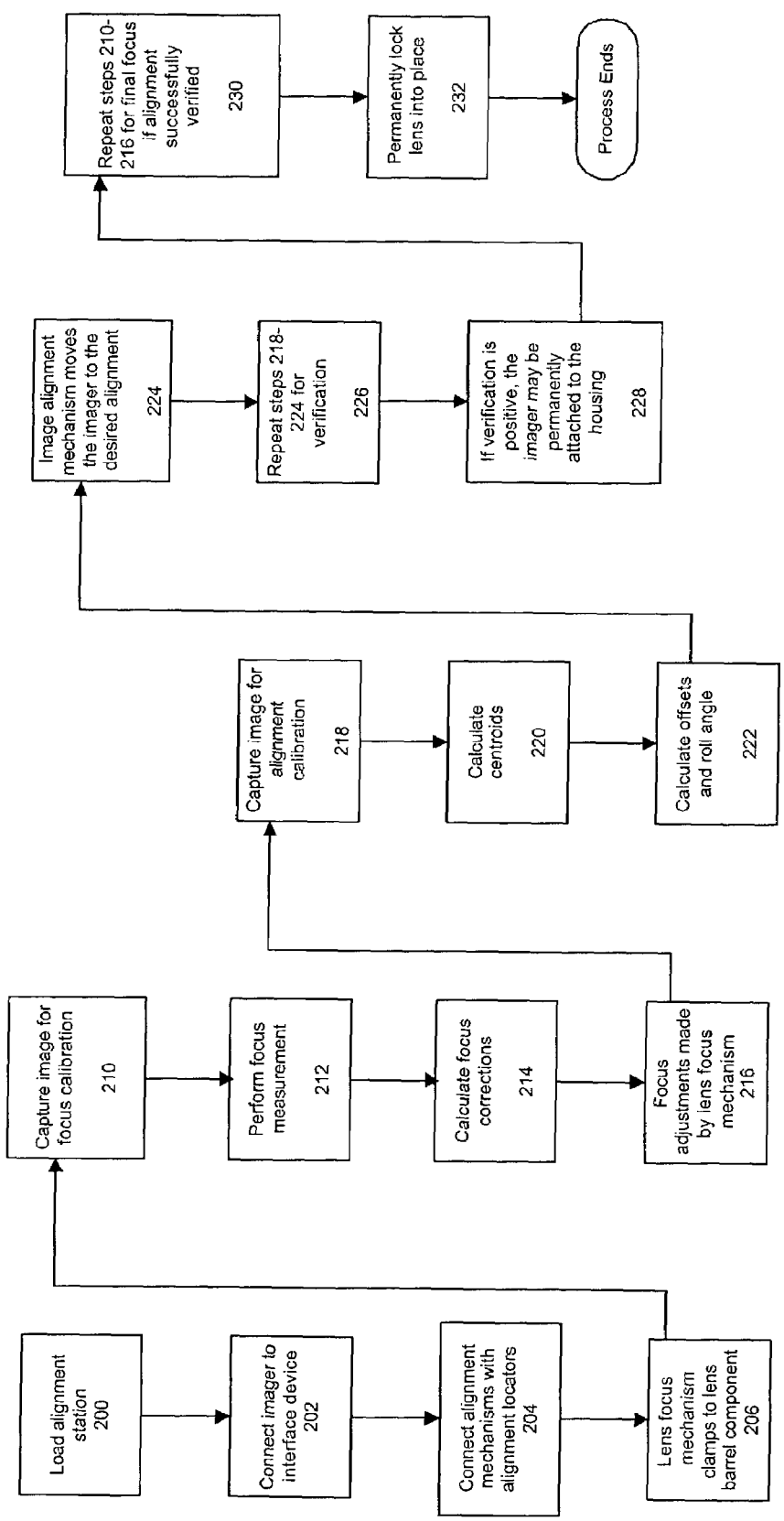
FIG. 14 shows a flow chart illustrating one example of an imaging tool configuration method.

FIG. 14 shows a flow chart illustrating one example of an imaging tool configuration method.

A. EXAMPLE 1

At 200, the alignment station is loaded with the various components of the imaging tool 28. The imager 54 is preferably loaded with the circuit board 102 attached. The lens 48 and housing components (including the front housing component 164 and the rear housing component 166) are also loaded into the alignment station. This step can be performed by a human being, or by some automated means such as a robot or automated machine tool. The lens 48 need not be focused when loaded. The lens 48, imager circuit card 102 with imager 54, and imager housings 164 and 166, should be movable, adjustable, or otherwise configurable at this step to allow the imager circuit card 102 to be moved in the x and y directions. The distance between the lens 48 and the source image 22 should be set at some predefined sensor distance. In an airbag deployment embodiment, the sensor distance should be approximately between 15 inches and 25 inches due to the probable sensor distance between the imaging tool 28 in the vehicle, and the occupant of the vehicle. In a preferred airbag deployment embodiment, the sensor distance is set at approximately 19 inches. The source image 22 as discussed above, can include a wide variety of different source objects, but preferably includes two black symmetrical shapes such as circles on a black background.

At 202, the imager 54 is connected electronically to the interface device 36, the actuator controller 34, the focus actuator 26, and to the alignment actuators 32. The exact configuration of connections can vary widely in the various embodiments of the system 20. FIG. 1 provides one example of some of the connections that can be incorporated into the system 20. Any connection configuration is acceptable so long as information can flow from the imager 54 to the other components. In some embodiments of the system 20, wireless technology is used to "wire" the components together. In a preferred embodiment, the imager 54 does not transmit any type of image outside the confines of the imaging tool 28. Instead, the imager 54 transmits a message to the other components of the system 20, and that message includes instructions with respect to the adjustments described in FIG. 11. This step is can be performed by a human being, a robot or other form of automated machine tool.

At 204, the alignment mechanisms (e.g. alignment actuators 32) are connected with the alignment locators as illustrated in FIG. 4 where the actuators are shown in both engaged and disengaged positions. This step is preferably performed by a human being, but they could also be performed by a robot or other form of automated machine tool.

At 206, the focus mechanisms (e.g. focus actuators 26) are clamped to the to the lens barrel 46 component as illustrated in FIG. 2. This step is preferably performed by a human being, but they could also be performed by a robot or other form of automated machine tool.

At 210 a series of calibration images 120 can be captured from the source image 22 based upon the position information feedback provided by the lens focus mechanism. One calibration image 120 should be captured at a predefined or preset focus point. At least one calibration image 120 should preferably be captured on each side of the preset focus point. Thus, there should be at least three images captured for focusing purposes, one at the preset focus point, and one on each side of the preset focus point.

At 212, one or more forms of focus measurement are invoked. The type of measurement invoked depends on the heuristic being performed. Various focus heuristics can be performed by the system 20 in order to adjust the position of the lens 48 along the z-axis 126 with respect to the source image 22. One heuristic that can be performed can be referred to as a blur circle diameter heuristic, or blur circle measurement heuristic. This heuristic minimizes the amount of de-focusing by minimizing the area of the Gaussian defocus. The system 20 can also perform an edge contrast heuristic which attempts to sharpen the distinction between the object and the background, and this seeks to maximize the slope of the Gaussian defocus. In some embodiments, the two heuristics can be combined in a weighted fashion. In still other embodiments, other heuristics can be included as focus heuristics.

At 214, the system 20 calculates the focus corrections/adjustments using the heuristic(s) invoked at 212.

At 216, focus adjustments are physically made by the lens focus mechanisms. This step can be performed automatically by the system 20, and thus does not require any type of human intervention.

At 218, the system 20 begins to invoke alignment-related processing. A calibration image 120 is captured for alignment calibration. An example of this step is illustrated in FIG. 9.

At 220, the centroids of the objects in the images can be calculated. FIGS. 10 and 11 provide examples of such calculations. In a preferred embodiment, the centroids are calculated to subpixel accuracy, with a pixel being no larger than 12 square microns.

At 222, the offsets and roll angle are calculated for the actual alignment 132 relative to the desired alignment 130. An example of this step is illustrated in FIGS. 9, 10, and 11.

At 224, the image alignment mechanisms move the imager 54 to the desired alignment. This is done by moving the imager circuit card 102 or any other component to which the imager 54 is fixed.

At 226, the adjusted alignment can be validated. In order to validate the new alignment, steps 218 through 224 can be repeated with the new alignment.

At 228, if the verification is positive, the imager 54 may be permanently positioned within the imaging tool 28. Depending the particular structure of the imaging tool 28, this can include making fixed the imaging circuit board 102, the imager and lens housing component 164, or any other type of component included in the imaging tool 28. Attaching the circuit board 102 to the housing component 164 can be done with a tapered fastener or a compliant press-fit fastener.

At 230, steps 210–216 are repeated to ensure that the alignment process did not alter the optimal focus. At 232, if the proper focus is verified, the lens 48 can be permanently locked in place and the configuration system 20 can then begin work on a new imaging tool 28. The lens 48 can be locked permanently in place using a mechanical fastener of quick-set UV, a thermal cure epoxy, or some other fastener.

B. EXAMPLE 2

FIG. 15 shows a flow chart illustrating a second example of an imaging tool configuration method.

At 250, the calibration image 120 is captured from the source image 22 with the imaging tool 28. A reference point is identified on the calibration image 120 for the purposes of calibration. This reference point is typically a centroid of one or more source objects. At 254, an alignment adjustment is calculated using one or more alignment heuristics discussed above. Those heuristics compare the calibration image 120 with the source image 22 or the desired template image. At 256, the system 20 can automatically align the imager 54 and the imaging tool 28 through the use of the alignment actuators 32.

C. EXAMPLE 3

FIG. 16 shows a flow chart illustrating a third example of an imaging tool configuration method. At 260, the various components of the imaging tool 28 are loaded into the alignment station. At 262, the imager 54 is connected to a control device, such as the interface device (e.g. access device) 36 or the actuator controller 34. At 264, the system 20 automatically focuses the lens 48 with the focus actuator 26. At 266, the system 20 automatically aligns the circuit board 102 with the alignment actuators 32.

There are numerous different processes that the system 20 can perform to automatically configure imaging tools 28. Different embodiments may incorporate different variations of steps and combinations of steps.

IV. Subsystem-Level Views

Figure 17:
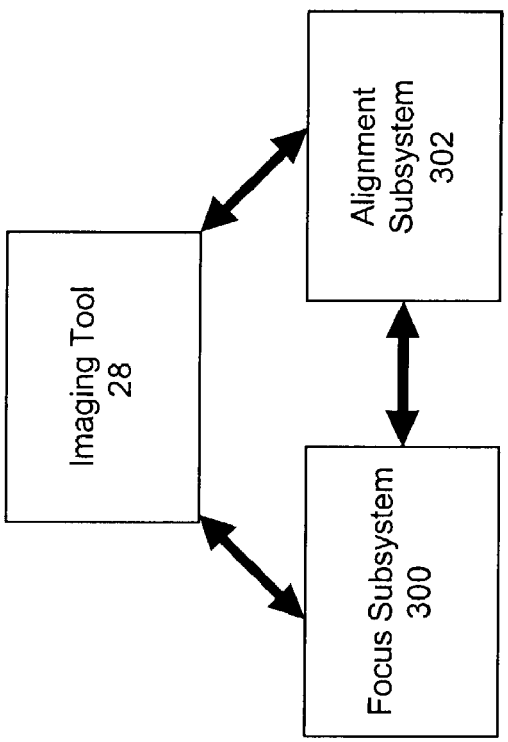
FIG. 17 shows a block diagram illustrating an example of a subsystem-level view of a configuration system.

FIG. 17 shows a block diagram illustrating an example of a subsystem-level view of a configuration system 20. A focus subsystem 300 and an alignment subsystem 302 are used by the system 20 to configure the imaging tool 28.

A. Imaging Tool

The imaging tool 28 provides for the capture of the calibration image 120 from the source image 22. In some embodiments, the source image 22 is itself captured from a source object, while in other embodiments, the source image 22 is not a captured image, but instead is directly created for the purposes of configuring the imaging tool 28. For example, the source image for image tooling 28 in a preferred airbag deployment application embodiment of the configuration system 20 is two black circles on a white background.

As discussed above, the imaging tool 28 can include a variety of different components, such as the lens 48, the imager and lens housing 84, and the imager 54, which can reside on a printed circuit board 102. The exact design and composition of the imaging tool 28 will depend on the type of pre-defined application that will utilize the imaging tool 28. Similarly, the focus and alignment requirements for the imaging tool 28 will also depend on the desired environment and context of the particular application.

In a preferred embodiment, the imager 54 or some other device in the imaging tool 28 actually performs the calculations required by the focus subsystem 300 and alignment subsystem 302. Instead of passing an image to the other components of the configuration system 20, the imager 54 can pass a message with the pertinent offset adjustments, roll angles, and other relevant data.

B. Focus Subsystem

The focus subsystem 300 includes any lens focus mechanisms ("LFM") such as various focus actuators 26 discussed above. The focus subsystem 300 can perform a wide variety of different processes (e.g. "focus heuristics") for focusing the lens 48 of the imaging tool 28. Some embodiments of the focus subsystem 300 may combine the results of more than one focus heuristic in determining and implementing the appropriate focus for the imaging tool 28.

The focusing of the lens 48 involves moving the lens 48 along the z-axis. This is in contrast to the aligning of the imaging tool 28, which occurs through movement in the x-axis and y-axis. The lens focus mechanism clamps to the housing of the lens 48. Based upon the position information feedback by the lens focus mechanism, at least three images. These images can be referred to as focus images, calibration images, or focus calibration images. One image is captured at a preset focus point. At least one image should be captured on each end of the preset focus point. In a preferred focus heuristic, blur circle measurements or blur circle diameters are used to calculate focus corrections that can then be implemented by the lens focusing mechanisms. In other embodiments, an edge contrast heuristic can be applied by the focus subsystem 300.

The focus subsystem 300 can be totally automated, to support the accurate, prompt, and cost-effective configuration of imaging tools 28 for embedded use in various application environments. The focus actuators 26 can automatically focus the lens 48 of the imaging tool 28 without human intervention.

C. Alignment Subsystem

The alignment subsystem 302 can perform a variety of different alignment heuristics to properly align the imaging tool 28 in the dimensions of the x-axis and y-axis. In some embodiments, the alignment subsystem 302 can align the imager as it resides on a circuit board in the imager and lens housing 84. In other embodiments, the various components of the imaging tool 28 are not permanently assembled until after the imaging tool 28 is properly aligned by various alignment mechanisms, such as the alignment actuator 32.

To begin the alignment process, an image (e.g. "configuration image") is captured from the source image 22. Various different alignment heuristics can be applied to the configuration image. In an embodiment involving objects in the configuration image, a reference point (e.g. "calibration reference points") within the various objects can be selected. In preferred embodiments, the reference point is the centroid of the object. Regardless of the type of reference point, they should be calculated to the sub-pixel accuracy level. In a preferred embodiment, the automated alignment heuristic can align reference data points within two microns of the corresponding reference point in the template image.

The alignment subsystem 302 can be totally automated, to support the accurate, prompt, and cost-effective configuration of imaging tools 28 for embedded use in various application environments. The alignment subsystem 302 can be used to align the placement of the imager on the printed circuit board. The alignment subsystem 302 can also be used to align the circuit board within the imager and lens housing 84. The imager 54 and imager circuit board 102 can be aligned in a single motion in reaction to a calculated adjustment and a roll angle.

In a preferred embodiment, the alignment subsystem 302 compares the calibration image with that of the template image, which can simply be the source image 22.

D. Stereo Embodiments

Figure 18:
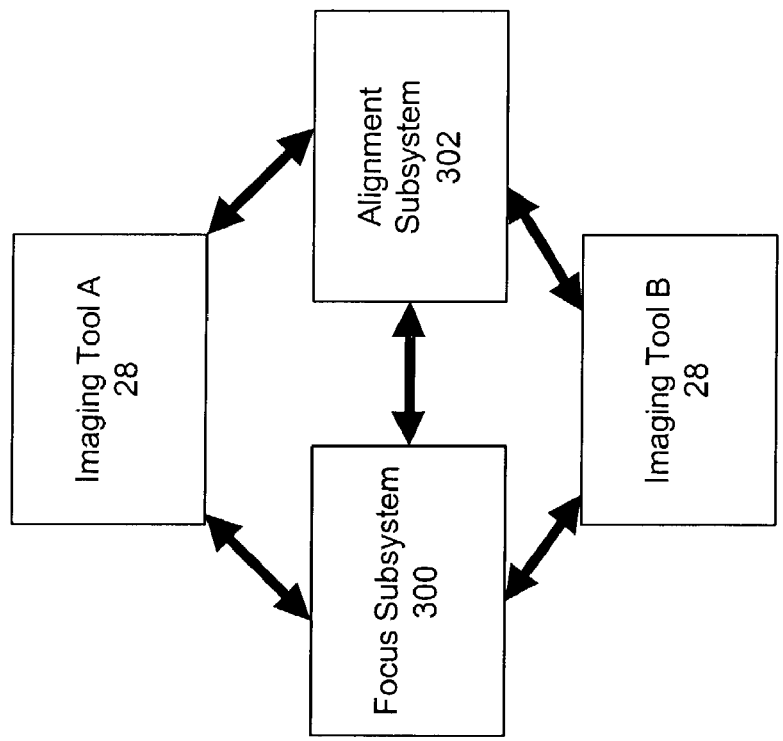
FIG. 18 shows a block diagram illustrating an example of a subsystem-level view of a configuration system configuring two imaging tools in stereo.

FIG. 18 shows a block diagram illustrating an example of a subsystem-level view of a configuration system configuring two imaging tools 28 in a substantially simultaneous manner. The subsystem view in FIG. 18 can incorporate the stereo calibration process illustrated in FIG. 12.

V. Alternative Embodiments

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application.

What is claimed is:

1. A method for configuring an imaging tool by aligning an imager within a housing component, comprising:
   capturing a calibration image from a source image with the imaging tool;
   calculating an adjustment by comparing a calibration reference point to a corresponding reference point in a template image;
   moving an alignment mechanism without human intervention in accordance with the calculated adjustment; and
   aligning an imager within a housing component through the movement of the alignment mechanism.

2. The method of claim 1, wherein a device inside the imaging tool calculates the adjustment.

3. The method of claim 2, wherein a controller receives a message from the imaging tool that includes the calculated adjustment and wherein the controller uses the message from imaging tool to invoke the movement in the alignment mechanism.

4. The method of claim 1, wherein the adjustment includes an offset and a roll angle.

5. The method of claim 1, wherein the source image includes at least two circles, wherein the calibration image includes at least two circles, and wherein the template image is the source image.

6. The method of claim 1, wherein the calibration reference point is a centroid of an object in the calibration image, and wherein the corresponding reference point in the template image is the centroid of the corresponding object in the template image.

7. The method of claim 1, wherein a tab connected to a circuit board connected to the imager is moved by the alignment mechanism to align the imager within the housing component.

8. The method of claim 1, wherein the imaging tool includes a housing component, a lens, and a circuit board; and wherein the housing component, lens, and circuit board are not permanently connected until after the alignment mechanism automatically moves in accordance with the calculated adjustment.

9. The method of claim 1, wherein the adjustment is calculated to sub-pixel accuracy.

10. The method of claim 9, wherein a pixel is no larger than 12 square microns.

11. The method of claim 1, further comprising installing the imaging tool in a vehicle for use in an airbag deployment application.

12. The method of claim 11, wherein the imaging tool is configured in accordance with an at-risk-zone of the vehicle.

13. The method of claim 1, further comprising focusing the imaging tool using a first picture of the source image, wherein the first picture is taken at a preset focus point.

14. The method of claim 13, wherein focusing the imaging tool includes taking three pictures of the source image, wherein a second picture is taken on a first side of the preset focus point, and wherein a third picture is taken on a second side of the preset focus point.

15. The method of claim 13, further comprising determining a focus adjustment using one of a blur circle diameter heuristic and an edge contrast heuristic.

16. The method of claim 1, further comprising locking a lens permanently in place using a mechanical fastener after aligning the imager within the housing unit.

17. The method of claim 16, wherein the mechanical fastener is one of a quick-set UV and a thermal cure epoxy.

18. The method of claim 1, attaching a circuit board permanently to a housing using component using one of a tapered fastener and a compliant press-fit fastener.

19. The method of claim 1, wherein moving an alignment mechanism in accordance with the adjustment is accomplished in a single angular motion.

20. The method of claim 1, further comprising positioning an alignment station between approximately 15 and 25 inches away from the lens.

21. The method of claim 1, wherein two imaging tools are configured in substantially simultaneous manner with respect to a single source image.

22. A method of configuring an image sensor for use in a vehicle, comprising:
   loading a lens, an imager, and an housing component into an alignment station;
   connecting an imager to a control device, wherein the imager is located on a circuit board;
   focusing the lens automatically with a lens focusing mechanism; and
   aligning the circuit board automatically with an alignment mechanism, wherein the imager is focused and aligned for use in a vehicle.

23. The method of claim 22, wherein the lens is not yet focused when loaded into said alignment station.

24. The method of claim 22, wherein the lens, the circuit board, and the housing component are not securely fastened together when loaded into the alignment station.

25. The method of claim 22, wherein the alignment station is pre-aligned to a source test image mounted between approximately 17 and 22 inches away from the lens.

26. The method of claim 22, wherein the focusing of the lens includes the capture of at least three images, with at least one image captured at a preset focus point, with at least one image captured above a preset focus point, and with at least one image captured below a preset focus point.

27. The method of claim 22, wherein focusing the lens includes at least one of:

deriving a focus correction using a blur circle diameter; and computing a focus correction using a edge contrast parameter.

28. The method of claim 22, wherein aligning the circuit board automatically with an alignment mechanism, includes:

calculating an offset between an ideal location and a current location; and moving the board in accordance with the calculated offset.

29. The method of claim 22, said aligning the board automatically with an alignment mechanism, including:

calculating a roll angle between an ideal position and a current position; and moving the circuit board in accordance with the calculated roll angle.

30. The method of claim 22, wherein the alignment mechanism moves the circuit board with a single angular movement.

31. The method of claim 22, wherein a plurality of imaging tools are focused and aligned in a coordinated fashion in a substantially simultaneous manner using the source image and the same alignment station.

32. The method of claim 22, said aligning the circuit board automatically with an alignment mechanism, comprising:

sending a message from a device on the circuit board to a controller;

instructing the alignment mechanism in accordance with the message;

wherein the controller is not part of the imaging tool;

wherein the message includes an adjustment value calculated by a device on the circuit board; and wherein the controller instructs the alignment mechanism in accordance with the message.

33. An imaging tool configuration system, comprising:

a first imaging tool, including a first lens, a first imager, and a first housing component; wherein said first imaging tool provides for the capture of a first calibration image;

a focus subsystem, including a first focus actuator and an automated focus heuristic, wherein said focus subsystem performs said automated focus heuristic, and wherein said first focus actuator automatically focuses said first lens; and an alignment subsystem, including an automated alignment heuristic and a first alignment actuator, wherein said alignment subsystem performs said automated alignment heuristic, and wherein said alignment actuator automatically aligns said first imager.

34. The system of claim 33, wherein said first imager is mounted on a printed circuit board that is moved by said alignment subsystem in a single angular motion.

35. The system of claim 33, wherein said alignment subsystem includes a computer on said first imager for calculating an adjustment used by said alignment actuator to automatically align said first imager.

36. The system of claim 33, wherein said first calibration image includes at least two circles.

37. The system of claim 33, wherein said automated alignment heuristic aligns a reference data point in said first calibration image within two microns of a corresponding data point in a template image.

38. The system of claim 37, further comprising:

a second imaging tool, including a second lens, a second imager, and a second housing component; wherein said second imaging tool provides for the capture of a second calibration image;

wherein said focus subsystem further includes a second focus actuator, wherein said focus subsystem performs said automated focus heuristic, and wherein said second focus actuator automatically focuses said second lens in a substantially simultaneous manner with respect to the automatic focusing of said first lens; and wherein said alignment subsystem further includes a second alignment actuator, and wherein said alignment actuator automatically aligns said second imager in a substantially simultaneous manner with respect to the automatic aligning of said first imager.

* * * * *